(12) United States Patent
Iida

(10) Patent No.: US 6,266,127 B1
(45) Date of Patent: Jul. 24, 2001

(54) IMAGE READING METHOD AND IMAGE READING DEVICE

(75) Inventor: Takayuki Iida, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/457,758

(22) Filed: Dec. 10, 1999

(30) Foreign Application Priority Data

Dec. 11, 1998 (JP) .................................................. 10-353284
Dec. 6, 1999 (JP) .................................................. 11-345753

(51) Int. Cl.⁷ .................................................. G03B 27/80
(52) U.S. Cl. .................................. 355/38; 355/68; 355/77; 396/567; 396/639
(58) Field of Search ............................ 396/567–570, 396/612, 639; 355/38, 77, 27–29, 68; 348/96, 97; 358/474, 487

(56) References Cited

FOREIGN PATENT DOCUMENTS

| 8-102827 | 4/1996 | (JP) | H04N/1/10 |
| 8-97950 | 4/1996 | (JP) | H04N/1/00 |
| 8-149367 | 6/1996 | (JP) | H04N/5/253 |

*Primary Examiner*—D. Rutledge
(74) *Attorney, Agent, or Firm*—Sughrue, Mion, Zinn, Macpeak & Seas, PLLC

(57) ABSTRACT

An image reading method and an image reading device enable an elongated photographic photosensitive material to always be read well even if the elongated photographic photosensitive material has connected portions or deformed perforations. When a discontinuous portion detecting sensor detects a discontinuous portion such as a connected portion or a deformed perforation, an image frame which will be at a position for reading at a time when the discontinuous portion may interfere with conveying rollers is predicted. While the discontinuous portion is being conveyed between auxiliary conveying rollers and the conveying rollers and after a predetermined amount of time has elapsed before a predicted image frame is read by a CCD line sensor, conveying of the elongated photographic photosensitive material is switched to the auxiliary conveying rollers, and the elongated photographic photosensitive material is read.

14 Claims, 12 Drawing Sheets

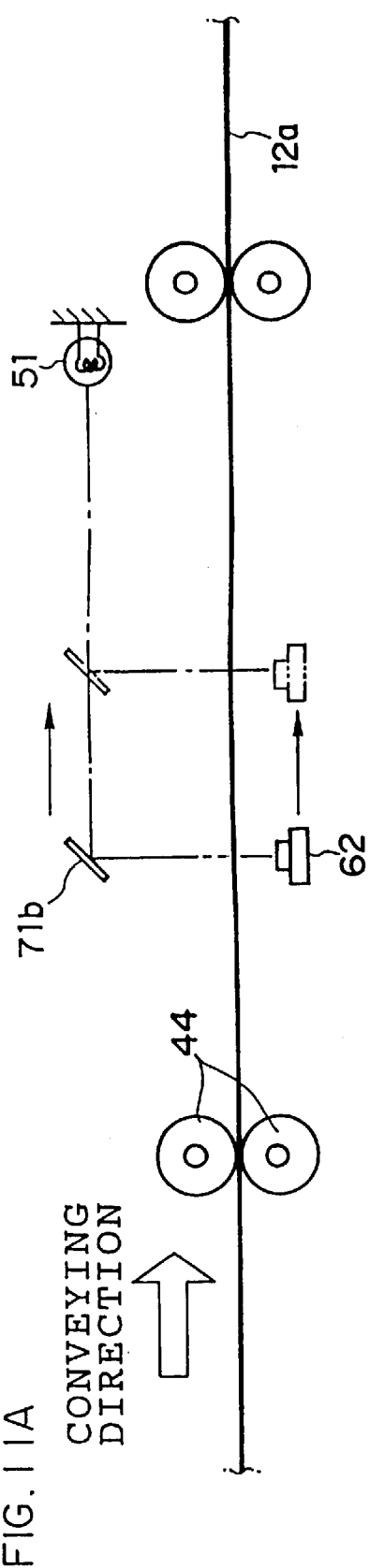
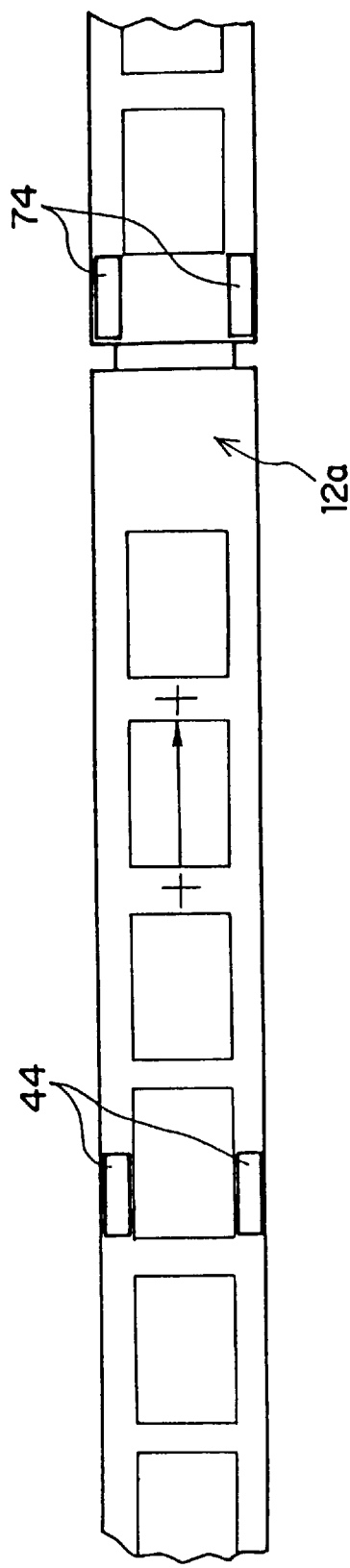
FIG. 11A
FIG. 11B

IMAGE READING METHOD AND IMAGE READING DEVICE

BACKGROUND OF THE INVENTION

1. Field of the Invention

The present invention relates to an image reading method and an image reading device, and in particular, to an image reading method and an image reading device which read an image recorded on a photographic photosensitive material such as a photographic film or the like.

2. Description of the Related Art

Among conventional laboratory systems which process images recorded on a photographic photosensitive material such as a photographic film or the like (hereinafter simply referred to as "film"), there are laboratory systems structured as follows. First, preliminary reading (hereinafter, prescanning) is conducted in which the images are read at a relatively high speed and relatively roughly. On the basis of the image data obtained by prescanning, photometric conditions, for the time that main reading (hereinafter, fine scanning) is carried out to read the images at a relatively low speed and in relatively great detail, and processing conditions, for image processing to be carried out on the image data obtained by the fine scanning, are determined. Fine scanning is carried out on the basis of the determined photometric conditions, and image processing is carried out under the determined processing conditions on the image data obtained by fine scanning.

In this type of laboratory system, an image reading device used to read images recorded on a film may include two photometric systems equipped with CCD sensors for reading the images, in order to accelerate the image reading processing. Prescanning and fine scanning are carried out at the respectively different photometric systems, so as to be carried out in parallel.

Recently, there has been demand for so-called large-scale reading in which a large number of films are continuously read in order to improve the processing capability.

Generally, in order to efficiently read a large number of developed films, there is proposed a system in which end portions of respective films are connected together by splicing tape or the like to form an elongated film, and this elongated film is continuously read while being conveyed by a conveying device such as conveying rollers or the like. Further, there has been proposed, as another method, a method in which long ends (ends in which perforations are formed) of plural piece films which have been cut per plural frames are adhered to an elongated tab, so as to form an elongated form.

However, when an elongated film in which films are connected together by splicing tape or the like is conveyed, there is a drawback in that a connected portion thereof may catch on conveying rollers and the connected portion and the conveying rollers may interfere with each other so as to change the speed of the conveying rollers, which changes the conveying speed of the film. If the conveying speed of the film changes while an image frame is being read, a problem arises in that satisfactory reading cannot be carried out.

Further, when a film which includes deformed perforations is conveyed, the deformed perforations may catch on the conveying rollers and the deformed perforations and the conveying rollers may interfere with each other so as to change the conveying speed of the conveying rollers, which slows down the conveying speed of the film. Thus, when a film including deformed perforations is conveyed, a problem arises in that satisfactory reading cannot be carried out.

SUMMARY OF THE INVENTION

In view of the aforementioned, an object of the present invention is to provide an image reading method and an image reading device in which satisfactory reading can be carried out without being affected by connected portions or deformed perforations which cause changes in the conveying speed.

In order to achieve the above-described object, a first aspect of the present invention is an image reading method in which an elongated photographic photosensitive material on which a plurality of image frames are recorded is conveyed along a longitudinal direction of the elongated photographic photosensitive material and the image frames are read at an image reading position which is formed along a direction which is orthogonal to a conveying direction, comprising the steps of: detecting a portion of the elongated photographic photosensitive material which may change a conveying speed of the elongated photographic photosensitive material by interfering with a conveying means, which conveys the elongated photographic photosensitive material, while the conveying means is conveying the elongated photographic photosensitive material; predicting an image frame which will be read by an image reading means, which reads image frames, at the time that the detected portion of the elongated photographic photosensitive material may interfere with the conveying means; and reading the predicted image frame by the image reading means such that the portion of the elongated photographic photosensitive material does not interfere with the conveying means.

By detecting a portion of the elongated photographic photosensitive material which may change a conveying speed of the elongated photographic photosensitive material by interfering with a conveying means, which conveys the elongated photographic photosensitive material, while the conveying means is conveying the elongated photographic photosensitive material; predicting an image frame which will be read by an image reading means, which reads image frames, at the time that the detected portion of the elongated photographic photosensitive material may interfere with the conveying means; and reading the predicted image frame by the image reading means such that the portion of the elongated photographic photosensitive material does not interfere with the conveying means, deterioration of the accuracy of reading the predicted image frame due to the conveying speed changing while the predicted image frame is being read can be prevented. Accordingly, good reading of image frames can always be carried out.

As one method of reading the predicted image frame by the image reading means such that the portion of the elongated photographic photosensitive material does not interfere with the conveying means, for example, as in the second aspect, when at least the predicted image frame is read by the image reading means, instead of being conveyed by the conveying means, the elongated photographic photosensitive material is conveyed by an auxiliary conveying means which is provided at a position which is separated from the conveying means by a predetermined distance in the conveying direction of the elongated photographic photosensitive material.

Or, as another method of reading the predicted image frame by the image reading means such that the portion of the elongated photographic photosensitive material does not interfere with the conveying means, for example, the predicted image frame may be read by moving the image reading position (i.e., the image reading position of the image reading means with respect to the conveying path along which the elongated photographic photosensitive material is conveyed) by moving a mirror whose reflection angle varies or a mirror which can move parallel with the reflection angle thereof fixed. Alternatively, the predicted image frame may be read by moving the image reading position by moving the reading means itself.

The third aspect of the present invention is a device which can realize the image reading method of the first aspect, and is an image reading device which includes: a plurality of conveying means for conveying an elongated photographic photosensitive material on which a plurality of image frames are recorded; image reading means for reading an image frame of the elongated photographic photosensitive material conveyed by the conveying means; sensing means for sensing a portion of the elongated photographic photosensitive material which portion may change a conveying speed of the elongated photographic photosensitive material, due to the portion interfering with one of the plurality of conveying means while the elongated photographic photosensitive material is being conveyed by the one of the plurality of conveying means; predicting means for predicting, on the basis of results of sensing by the sensing means, an image frame which will be read by the image reading means at the time the portion of the elongated photographic photosensitive material may interfere with the one of the plurality of conveying means; and control means for effecting control such that the predicted image frame is read by the image reading means such that the portion of the elongated photographic photosensitive material does not interfere with the one of the plurality of conveying means.

Further, the "portion of the elongated photographic photosensitive material which portion will may change a conveying speed of the elongated photographic photosensitive material by interfering with a conveying means, which conveys the elongated photographic photosensitive material, while the conveying means is conveying the elongated photographic photosensitive material" (hereinafter, "the interfering portion") is, for example, in an elongated photographic photosensitive material in which longitudinal direction end portions of plural photographic photosensitive materials are adhered together by adhesive tape or the like, or in an elongated photographic photosensitive material which is formed by plural photographic photosensitive materials being adhered to an elongated tab (ones of transverse direction ends of photographic photosensitive materials (the portions in which perforations are formed) being adhered to one transverse direction end of an elongated tab), the aforementioned portion may be a discontinuous portion, for example, a portion at which respective photographic photosensitive materials are joined together or a broken portion of the photographic photosensitive material such as a deformed perforation, or the like.

Namely, in the third aspect of the present invention, an image frame, which is to be read at the time the interfering portion may interfere with a specific conveying means (the one of the plurality of conveying means), is predicted by the predicting means on the basis of the results of detection by the detecting means. The control means effects control such that, in a state in which the interfering portion does not interfere with the specific conveying means, the predicted frame is read. Thus, the conveying speed can be prevented from varying while the predicted image frame is being read, and a deterioration in the accuracy of reading can be prevented. Accordingly, good reading of images can always be carried out.

As the structure for reading the predicted frame in a state in which the interfering portion does not interfere with the specific conveying means, for example, as in the fourth aspect, the image reading device may further include an auxiliary conveying means which conveys the elongated photographic photosensitive material and is provided at a position which is separated from the one of the plurality of conveying means by a predetermined distance in the conveying direction of the elongated photographic photosensitive material, wherein the controlling means effects control such that, when at least the predicted image frame is read by the image reading means, the elongated photographic photosensitive material is conveyed by the auxiliary conveying means instead of being conveyed by the one of the plurality of conveying means.

In accordance with this structure, there is no conveying means that will interfere with the interfering portion during conveying. Thus, the conveying speed can always be maintained constant, and good reading is possible.

Further, in a fifth aspect of the present invention, the image reading device may further include reading position moving means for synchronously moving a position of light illuminated onto the elongated photographic photosensitive material and a reading position on the elongated photographic photosensitive material by the image reading means, wherein the control means effects control such that in a state in which conveying of the elongated photographic photosensitive material is stopped, the reading position moving means moves a position of light illuminated onto the elongated photographic photosensitive material and a reading position on the elongated photographic photosensitive material by the image reading means, so that at least the predicted image frame is read by the image reading means.

In accordance with this structure, in a state in which the conveying of the photographic photosensitive material is stopped, the reading side (for example, the light source and the mirror (or the like)) is moved so as to read the predicted image frame. Thus, even if the portion of the elongated photographic photosensitive material interferes with the conveying means while the photographic photosensitive material is being conveyed, there is no adverse effect on the reading of the image frame.

The reading position moving means may be structured such that, for example, the image reading position is moved by deflecting the reading path without moving the position of the reading means at the reading means side. Or, the reading means itself may be moved so as to move the image reading position.

In the sixth aspect of the present invention, in the image reading device of the third aspect, the elongated photographic photosensitive material is formed by ones of transverse direction ends of a plurality of photographic photosensitive materials being adhered to a transverse direction end of an elongated tab, the conveying means is formed from a first conveying means which nips other transverse direction ends of the photographic photosensitive materials and whose nipping of the other transverse direction ends of the photographic photosensitive materials can be released and which conveys the elongated photographic photosensitive material, and a second conveying means which nips the elongated tab and conveys the elongated photographic photosensitive material, and the control means effects control such that, before the first conveying means interferes with the portion of the elongated photographic photosensitive material, nipping of the photographic photosensitive materials by the first conveying means is released and the elongated photographic photosensitive material is conveyed by the second conveying means.

A seventh aspect of the present invention is an image reading device which reads an image frame of an elongated photographic photosensitive material which is formed by respective one transverse direction ends of plural photographic photosensitive materials being adhered to one transverse direction end of an elongated tab, the image reading device including: nipping means for nipping a photographic photosensitive material such that the photographic photosensitive material can be conveyed, the nipping means being structured such that nipping of the photographic photosensitive material is releasable; tab conveying means for nipping and conveying the elongated tab; reading means for reading, at a predetermined reading position, an image frame being conveyed; detecting means for, while the elongated photographic photosensitive material is being conveyed, detecting a portion of a photographic photosensitive material that may interfere with the nipping means and change the conveying speed; and control means for, on the basis of results of detection by the detecting means, effecting control such that before the portion of the photographic photosensitive material interferes with the nipping means, the nipping of the photographic photosensitive material by the nipping means is released and the image frame is read by the reading means.

Namely, in the seventh aspect, the elongated photographic photosensitive material is formed by the long sides of plural photographic photosensitive materials being adhered along an elongated tab. While the elongated photographic photosensitive material is being conveyed by the tab conveying means, the elongated photographic photosensitive material is movably nipped by the nipping means. Therefore, the photographic photosensitive material can be prevented from fluttering about during conveying.

On the basis of the results of detection by the detecting means, before a portion of the elongated photographic photosensitive material (i.e., the interfering portion) interferes with the nipping means, the nipping of the photographic photosensitive material (the portion of the elongated photographic photosensitive material) by the nipping means is released. Thus, there is no interference between the nipping means and the portion of the elongated photographic photosensitive material. Namely, when the portion of the elongated photographic photosensitive material, which portion may interfere with the nipping means and vary the conveying speed of the elongated photographic photosensitive material, passes by the nipping means, the conveying by the nipping means is canceled, but the conveying by the tab conveying means continues. Therefore, the image can be read efficiently without stopping the conveying of the photographic photosensitive material.

The eighth aspect of the present invention is an image reading device including: nipping means for nipping a photographic photosensitive material such that the elongated photographic photosensitive material can be conveyed; tab conveying means for nipping the elongated tab and conveying the elongated photographic photosensitive material; reading means for reading, at a predetermined reading position, an image frame being conveyed; detecting means for, while the elongated photographic photosensitive material is being conveyed, detecting a portion of the elongated photographic photosensitive material that may interfere with the nipping means and change the conveying speed; predicting means for, on the basis of results of detection by the detecting means, predicting an image frame that will be read at the time the portion of the elongated photographic photosensitive material will interfere with the nipping means; reading position moving means for synchronously moving a position of light illuminated onto the photographic photosensitive material and a reading position on the photographic photosensitive material read by the reading means; and control means for controlling the reading position moving means such that, before the portion of the elongated photographic photosensitive material interferes with the nipping means, conveying of the elongated photographic photosensitive material is stopped, and at least the predicted image frame is read by the reading means.

Namely, in the eighth aspect, an image frame is predicted which will be read at the time the interfering portion may interfere with the nipping means during conveying of the elongated photographic photosensitive material which is formed by the long sides of plural photographic photosensitive materials being adhered along an elongated tab. Reading of the predicted image frame is carried out by stopping the conveying of the elongated photographic photosensitive material and moving the reading side. In this way, even if the interfering portion and the conveying means interfere with each other while the elongated photographic photosensitive material is being conveyed, there is no adverse effect on the reading of the image frame.

The reading position moving means may be structured, for example, such that the reading path is deflected and the image reading position is moved, without moving the position of the reading means at the reading means side. Or, the reading means itself may be moved so as to move the image reading position.

In the fifth and eighth aspects of the present invention, movement of the respective structural elements is controlled such that the position at which light is illuminated onto the photographic photosensitive material and the reading position on the photographic photosensitive material read by the reading means coincide with each other.

For example, the light source which illuminates light onto the photographic photosensitive material and the reading means which reads the region illuminated by the light source (i.e., which reads the light passing through the photographic photosensitive material) may be structured to be movable. The moving speeds and the moving directions of the light source and the reading means may be controlled such that the position at which light is illuminated onto the photographic photosensitive material and the reading position on the photographic photosensitive material which is read by the reading means coincide with each other.

Further, as another structure, the light source may be fixed, and the reading means may be movable. A light path deflecting member, which is movable and whose angle of deflection is fixed (e.g., a reflecting mirror), may be provided at the light source side (above the photographic photosensitive material). The moving speeds and the moving directions of the light path deflecting member and the reading means may be controlled such that the position of the light illuminated onto the photographic photosensitive material and the reading position on the photographic photosensitive material which is read by the reading means coincide with one another. Or, a structure which is the reverse of this structure may be applied. Namely, the light source can be made movable and the reading means may be fixed.

As yet another structure, the light source and the reading means may be fixed, and light path deflecting members, each of which is movable and whose angle of deflection is fixed, may be provided both at the light source side and at the reading means side. The moving speeds and moving directions of the two light path deflecting members may be controlled so that the position of light illuminated onto the photographic photosensitive material and the reading position on the photographic photosensitive material read by the reading means coincide with one another.

The ninth aspect of the present invention is an image reading device which reads an image frame of an elongated photographic photosensitive material which is formed by respective one transverse direction ends of plural photographic photosensitive materials being adhered to one transverse direction end of an elongated tab, the image reading device including: tab conveying means for nipping the tab and conveying the elongated photographic photosensitive material; reading means for reading, at a predetermined reading position, an image frame being conveyed; and a guide member for guiding the tab and the photographic photosensitive material such that the tab and the photographic photosensitive material are conveyed in a state of being curved in a convex shape, wherein the reading position is provided at a position at which the guide member becomes a top peak portion, and at least the reading position on the guide member is a pass-through portion.

In the ninth aspect, by providing the guide member at the conveying path, the photographic photosensitive material conveyed along the conveying surface of the guide member can be made flat at the top portion position. At the same time, tension in the main scanning direction is applied to the elongated photographic photosensitive material so that it is difficult for the photographic photosensitive material to be twisted. As a result, even if there are connected portions or deformed portions of perforations which may cause the conveying speed to vary, no problems such as the photographic photosensitive material fluttering about are caused, and good reading is possible.

The pass-through (light pass-through) portion provided at the reading position may be formed from a material through which light can pass, or may be a slit, a cut-out portion or the like provided at a region corresponding to the reading position.

Further, in general, marks indicating positions of image frames are provided at the tab in correspondence with the respective image frames formed on the photographic photosensitive material. These marks are provided as notches, through-holes or the like in the tab of an elongated photographic photosensitive material which is formed by the long sides of plural photographic photosensitive materials being adhered along an elongated tab. Thus, the pass-through portion may be provided such that these marks can be read by the reading means. In this way, the marks can be reliably detected.

By structuring the reading means such that it reads both the image frames and the marks, the structure of the device can be simplified, which is preferable. A linear CCD is an optimal example of such a reading means.

BRIEF DESCRIPTION OF THE DRAWINGS

FIG. 11A is a schematic structural view, as viewed from a side surface, of main portions of a film image reading device, and explains another applied example of the third embodiment.

FIG. 11B is a top view of the structure illustrated in FIG. 11A.

DESCRIPTION OF THE PREFERRED EMBODIMENTS

First, the schematic structure of a film image reading device (image reading device) 16 which is a first embodiment of the present invention will be described on the basis of FIGS. 1 through 5.

Schematic Structure of Overall System

Figure 1:
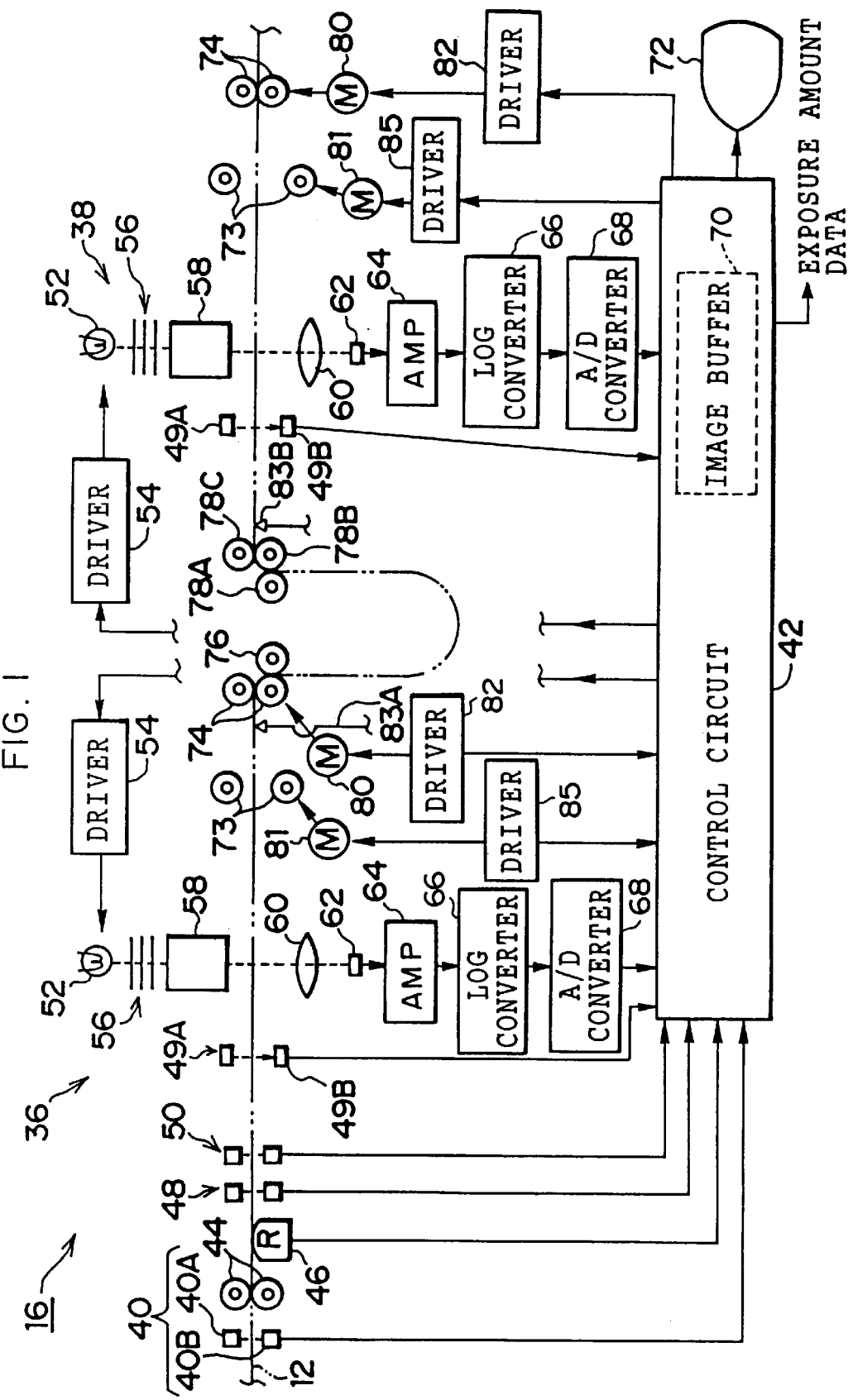
FIG. 1 is an explanatory view illustrating a schematic structure of a film image reading device relating to a first embodiment of the present invention.

FIG. 1 illustrates the schematic structure of the film image reading device 16 relating to the first embodiment. As illustrated in FIG. 1, a prescan section 36 and a fine scan section 38 are provided in order along a film conveying path within the film image reading device 16. Each of the scan sections 36, 38 carries out scanning-reading of images recorded on a developed photographic photosensitive material 11 (hereinafter referred to as "negative film 11", see FIGS. 2 and 3) as will be described later.

Figure 2:
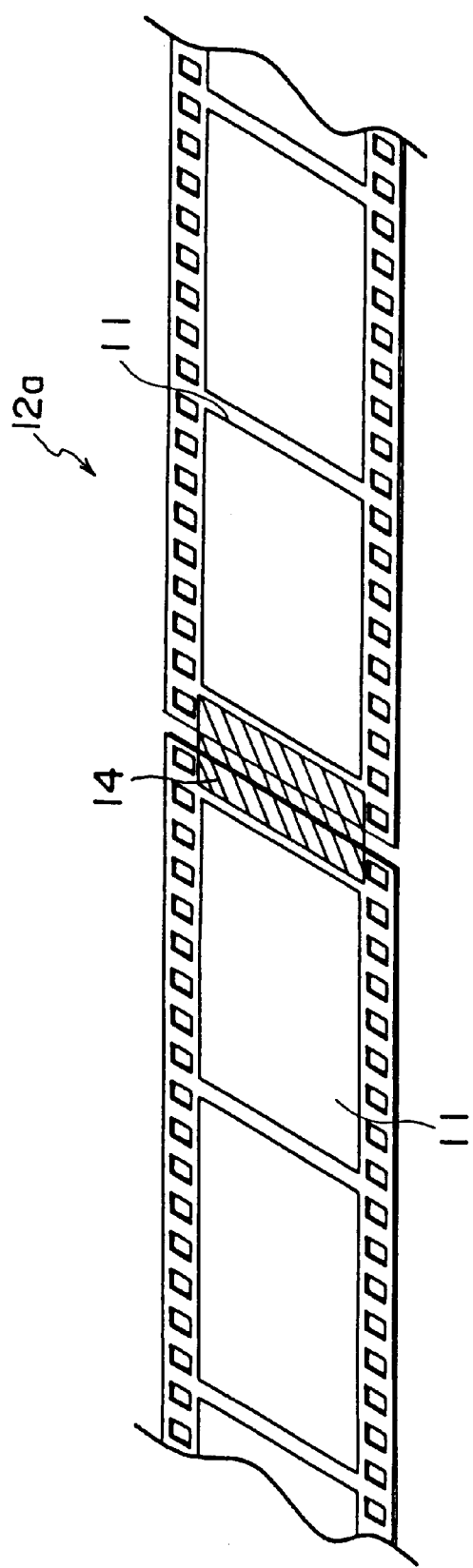
FIG. 2 is an explanatory view illustrating an example of a case in which a plurality of films are made into an elongated form by using splicing tape.
Figure 3:
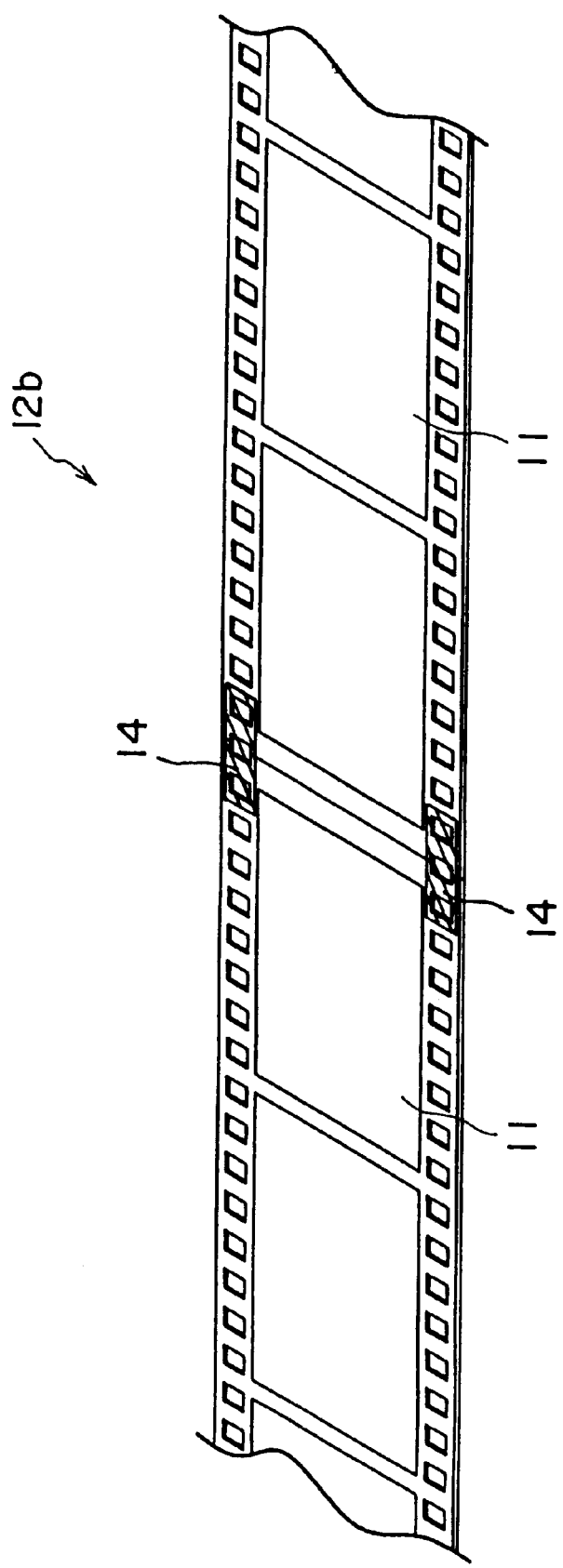
FIG. 3 is an explanatory view illustrating another example of a case in which a plurality of films are made into an elongated form by using splicing tape.

As illustrated in FIGS. 2 and 3, elongated films 12a,12b are the object of reading at the film image reading device 16 of the first embodiment. The films 12a, 12b are formed by connecting together, by an adhesive tape such as a splicing tape 14 or the like, plural negative films 11 on which a predetermined number of images have been photographed by a camera (not shown) and which have been developed. The elongated films 12a, 12b are wound in roll form and set at the film image reading device 16. Hereinafter, a description will be given of a case in which the elongated film 12a illustrated in FIG. 2 is wound in roll form and set at the film image reading device 16.

When a plurality of negative films are connected together, as illustrated in FIG. 2, the splicing tape 14 is adhered to transverse direction central positions of the negative film end portions. In a case in which plural piece films are to be connected together (the piece films being formed by cutting a single negative film per plural image frames), as illustrated in FIG. 3, the splicing tape 14 is adhered to the both transverse direction ends of the piece film end portions such that the splicing tape 14 is not adhered onto the image frame.

An insertion detecting sensor 40 is provided at an upstream side of a film conveying path of the film image reading device 16. The insertion detecting sensor 40 is structured such that a light emitting element 40A and a light receiving element 40B oppose each other as a pair across the film conveying path. The light receiving element 40B is connected to a control circuit 42. On the basis of the level of a signal outputted from the light receiving element 40B, the control circuit 42 determines whether the film 12a has been inserted onto the film conveying path of the film image reading device 16.

A pair of rollers 44, a reading head 46, a frame number detecting sensor 48, an image frame detecting sensor 50, and a discontinuous portion detecting sensor (sensing means) 49 are disposed in order between the insertion detecting sensor 40 and the prescan section 36. The reading head 46, the frame number detecting sensor 48, the image frame detecting sensor 50, and the discontinuous portion detecting sensor 49 are all connected to the control circuit 42.

At the reverse surface of the film 12a set at the film image reading device 16, a transparent magnetic material is applied so as to form a magnetic layer. Information such as frame numbers, the film type, the DX code, and the like is magnetically recorded on the magnetic layer. The reading head 46 is disposed at a position at which it can read the information magnetically recorded on the magnetic layer. The magnetic head 46 reads the information, and outputs the information to the control circuit 42.

In the same way as the previously-described insertion detecting sensor 40, the frame number detecting sensor 48 and the image frame detecting sensor 50 are each formed by a pair of elements which are a light emitting element and a light receiving element. The information such as the frame numbers and the like may be recorded optically (e.g., by a bar code or the like) on the film 12a. The frame number detecting sensor 48 is disposed at a position at which it can detect the optically recorded information such as the frame numbers or the like. The frame number detecting sensor 48 outputs the detected information such as the frame numbers or the like to the control circuit 42.

The image frame detecting sensor 50 is disposed at a position corresponding to the transverse direction central portion of the film 12a. The density of the non-image portions formed between images recorded on the film 12a is the base density of the film 12a. Thus, the amount of transmitted light at these non-image portions is large as compared to that at portions at which images are recorded. The control circuit 42 monitors the level of a signal outputted from the light receiving element of the image frame detecting sensor 50. When the level of the signal increases to and decreases from a predetermined level corresponding to the base density, the control circuit 42 determines that an edge of an image recorded on the film 12a has passed by the detection position of the image frame detecting sensor 50, and on the basis of this determination, determines the position (and size) of the image recorded on the film 12a.

The discontinuous portion detecting sensors 49 are provided at positions corresponding to the transverse direction end portions of the negative film 12. Each discontinuous portion detecting sensor 49 is formed from a light emitting element 49A and a light receiving element 49B which are disposed so as to oppose one another at opposite sides of the film conveying path.

The light receiving element 49B is connected to the control circuit (control means, predicting means) 42. On the basis of a change in the level of the signal outputted from the light receiving element 49B, the control circuit 42 determines whether a portion of the film 12a which portion may change the conveying speed is passing by the detection position of the sensor 49.

Here, "a portion of the film 12a which portion may change the conveying speed" refers to a discontinuous portion such as a connected portion between negative films 11, or a deformed portion (e.g., a torn portion) of a perforation, or the like.

Namely, the connected portions of negative films 11 are connected by the splicing tape 14. Because the end sides are separated, at the connected portion, the light receiving element 49B directly receives light from the light emitting element 49A. Further, at the deformed portions (e.g., torn portions) of perforations as well, the light receiving element 49B directly receives the light from the light emitting element 49A. In contrast, at portions which are neither connected portions nor deformed portions of perforations, the light receiving element 49B receives light from the light emitting element 49A via the film base.

At the portions which are not connected portions and the portions at which there are no deformed portions of perforations, the base density of the negative film 11 is detected. Therefore, the amount of transmitted light is smaller than that at the connected portions and the deformed portions of perforations where the light from the light emitting element 49A is directly incident.

Accordingly, the control circuit 42 monitors the level of the signal outputted from the light receiving element 49B of the discontinuous portion detecting sensor 49. For example, when the level again returns to the level corresponding to the base density after having become greater than the predetermined level corresponding to the base density, it is determined that there is a discontinuous portion, and on the basis of these results of detection, an image frame at the reading position at the time the discontinuous portion will interfere with a conveying roller pair (conveying means) 74 is predicted, and the conveying roller pair 74 and an auxiliary conveying roller pair (auxiliary conveying means) 73 are controlled (as will be described later).

The prescan section 36 is provided with a lamp 52 which is disposed so as to illuminate light toward the film 12a which is passing through the prescan section 36. The lamp 52 is connected to the control circuit 42 via a driver 54. The magnitude of the voltage supplied from the driver 54 is controlled by the control circuit 42 such that the emitted amount of light becomes a predetermined value.

A CC filter group 56, which is formed from three CC filters of C (cyan), M (magenta) and Y (yellow), and a light diffusing box 58 are disposed in that order at the light emitting side of the lamp 52. At the other side of the film conveying path, a focussing lens 60 and a CCD line sensor (reading means) 62 are provided in that order.

The amounts of insertion onto the optical path of the respective CC filters of the CC filter group 56 are adjusted in advance so as to correct dispersion in the sensitivities of the three colors of R, G and B at the CCD line sensor 62. The light which passes through the CC filter group 56, the light diffusing box 58, the film 12a, and the focusing lens 60 in that order is illuminated onto the light receiving surface of the CCD line sensor 62.

An amplifier 64, a LOG converter 66, and an A/D converter 68 are connected in that order to the output side of the CCD line sensor 62. The signal outputted from the CCD line sensor 62 is amplified at the amplifier 64, logarithmically converted (converted to a level corresponding to the density value) at the LOG converter 66, and is converted into digital data of a value corresponding to the signal level at the A/D converter 68. The A/D converter 68 is connected to the control circuit 42. The digital data is inputted to the control circuit 42 as density value data.

A first roller group, which comprises the auxiliary conveying roller pair 73, the conveying roller pair 74, and a slave roller 76, and a second roller group, which comprises slave rollers 78A, 78B, 78C, are disposed so as to be separated from each other by a predetermined distance, between the prescan section 36 and the fine scan section 38. A loop of the film 12a is formed between the two roller groups. Due to this loop, the difference between the conveying speed of the film 12a in the prescan section 36 and the conveying speed of the film 12a in the fine scan section 38 can be absorbed.

A pulse motor 80 is connected to the conveying roller pair 74 of the first roller group. The pulse motor 80 is connected to the control circuit 42 via a driver 82. The conveying roller pair 74 is, by a withdrawing (withdrawing releasing) mechanism (not shown), set in a state of being withdrawn from the conveying path at the time the auxiliary conveying roller pair 73 conveys the film 12a as will be described later.

The auxiliary conveying roller pair 73 is provided at a position which is spaced apart by at least one image frame from the conveying roller pair 74 at the upstream side of the conveying roller pair 74. An auxiliary pulse motor 81 is connected to the auxiliary conveying roller pair 73. The auxiliary pulse motor 81 is connected to the control circuit 42 via an auxiliary driver 85. The auxiliary conveying roller pair 73 is, by the unillustrated withdrawing (withdrawing releasing) mechanism, set in a state of being withdrawn from the conveying path at the time of normal conveying of the film.

The control circuit 42 usually drives the conveying roller pair 74 to convey the film 12a by driving the pulse motor 80 via the driver 82. Further, when the level of the signal from the discontinuous portion detecting sensor 49 becomes greater than the predetermined level corresponding to the base density and it is determined that there is a discontinuous portion, after a predetermined amount of time passes, the control circuit 42 stops the pulse motor 80 via the driver 82, stops the driving of the conveying roller pair 74, withdraws the conveying roller pair 74 from the conveying path by the unillustrated withdrawing mechanism, sets the auxiliary conveying roller pair 73, which is withdrawn from the conveying path by the unillustrated withdrawing mechanism, in a state of being able to convey the film 12a, and drives the auxiliary pulse motor 81 via the auxiliary driver 85 to convey the film 12a.

The predetermined amount of time, from the time a discontinuous portion has been detected on the basis of the signal from the discontinuous portion detecting sensor 49 to the time the driving of the conveying roller pair 74 is stopped, is determined as described below.

Figure 4:
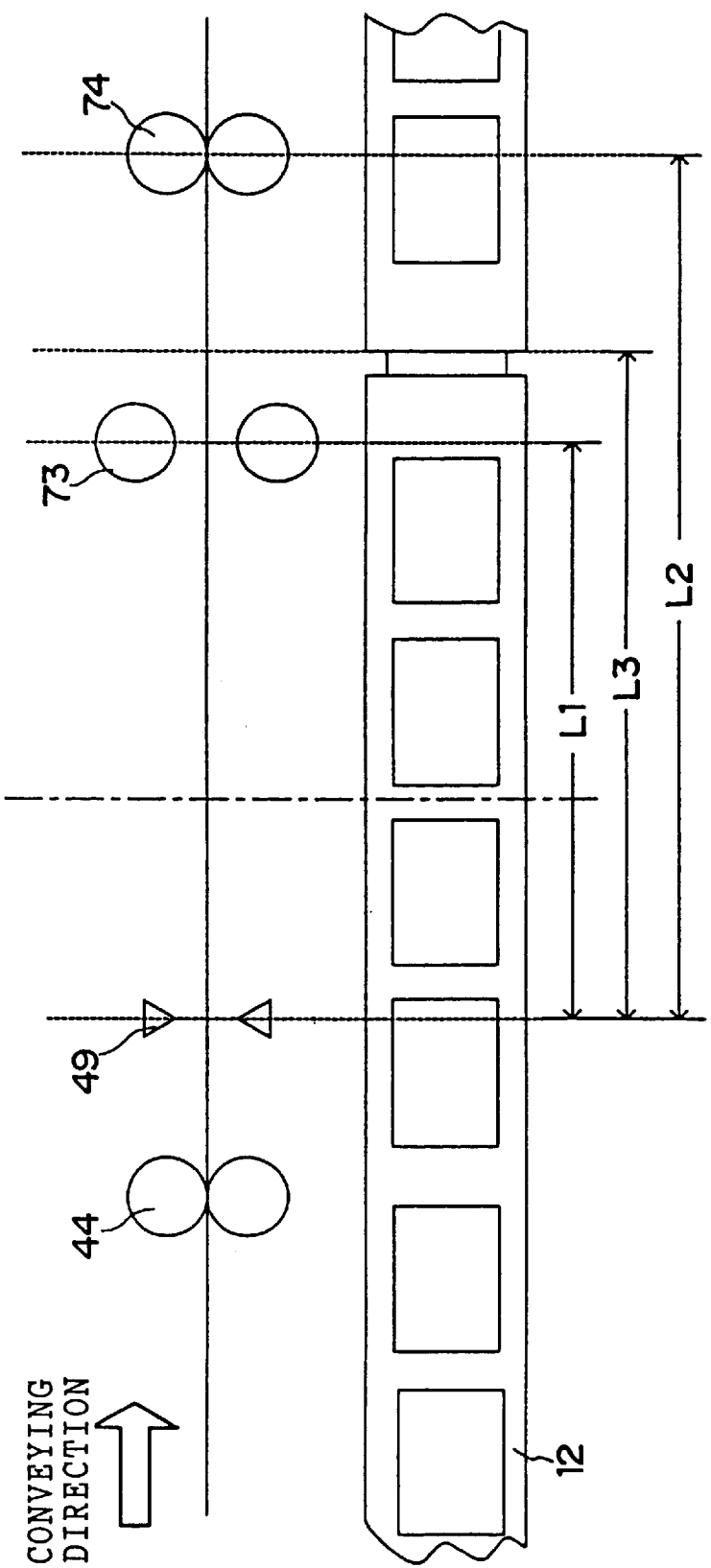
FIG. 4 is an explanatory view illustrating a position of a discontinuous portion detecting sensor, a position of an auxiliary conveying roller pair, and a position of a conveying roller pair.

As illustrated in FIG. 4, the position of the discontinuous portion detecting sensor 49, the position of the auxiliary conveying roller pair 73, and the position of the conveying roller pair 74 are respectively fixed with regard to the direction orthogonal to the conveying direction. Further, the conveying speed is constant. Therefore, on the basis of a distance L1 from the position of the discontinuous portion detecting sensor 49 to the auxiliary conveying roller pair 73, a time t1, from the time the discontinuous portion detected by the discontinuous portion detecting sensor 49 is at the position of the discontinuous portion detecting sensor 49 to the time that the discontinuous portion reaches the auxiliary conveying roller pair 73, is calculated. (This time t1 will hereinafter be referred to as the first time t1.) Similarly, on the basis of a distance L2 from the position of the discontinuous portion detecting sensor 49 to the conveying roller pair 74, a time t2, from the time the discontinuous portion detected by the discontinuous portion detecting sensor 49 is at the discontinuous portion detecting sensor 49 to the time that the discontinuous portion reaches the conveying roller pair 74, is calculated. (This time t2 will hereinafter be referred to as the second time t2.)

A time t3 is calculated which is from the time the discontinuous portion is detected by the discontinuous portion detecting sensor 49 to the time, within the period of time after the first time t1 has elapsed and until the second time t2 has been reached, that it is determined that a predetermined portion of a non-image portion between image frames recorded on the film 12a has passed the CCD line sensor 62 reading position. (Hereinafter, the time t3 will be referred to as the third time t3. In other words, the third time t3 is the time from the time the discontinuous portion passes the position of the discontinuous portion detecting sensor 49 to the time that the discontinuous portion is positioned between the auxiliary conveying roller pair 73 and the conveying roller pair 74 and a predetermined portion of a non-image portion between respective image frames recorded on the film 12a passes by the reading position of the CCD line sensor 62.) This third time t3 is the predetermined time until the driving of the conveying roller pair 74 is stopped.

When the discontinuous portion passes through the conveying roller pair 74 due to the conveying of the film 12a substantially by one image frame by the auxiliary conveying roller pair 73, the control circuit 42 stops the conveying of the film 12a by the auxiliary conveying roller pair 73, withdraws the auxiliary conveying roller pair 73 from the conveying path by the withdrawing means (not shown), and again starts the driving of the conveying roller pair 74.

A sensor for loop management 83A is disposed in a vicinity of the upstream side of the conveying roller pair 74, and a sensor for loop management 83B is disposed in a vicinity of the downstream side of the slave rollers 78B, 78C. Both sensors for loop management 83A, 83B are connected to the control circuit 42. In the present embodiment, the sensors for loop management 83A, 83B detect a mark on the film 12a (e.g., a splicing). At the point in time when the sensor for loop management 83A detects the mark while the film 12a is being conveyed, the control circuit 42 begins to count by a counter (not shown) provided at the control circuit 42. At the point in time that that same mark is detected by the sensor for loop management 83B, the control circuit 42 stops the counting by the unillustrated counter. On the basis of the obtained count value, the length of the loop (the length of the film 12a forming the loop) can be detected.

The discontinuous portion detecting sensors 49 are disposed between the slave rollers 78B, 78C and the fine scan section 38. The discontinuous portion detecting sensors 49 are provided at a position corresponding to both transverse direction end portions of the film 12a, and the output thereof is connected to the control circuit 42.

Similarly to the discontinuous portion detecting sensors 49 provided before the prescan section 36, each discontinuous portion detecting sensor 49 is formed from the light emitting element 49A and the light receiving element 49B which are disposed so as to oppose one another with the film conveying path therebetween. The light receiving element 49B is connected to the control circuit 42. On the basis of variations in the level of the signal outputted from the light receiving element 49B, the control circuit 42 determines whether a discontinuous portion of the film 12a has passed.

Because the fine scan section 38 is structured substantially similarly to the prescan section 36, the same reference numerals are used for the fine scan section 38 and description of the fine scan section 38 will be omitted.

As described above, in the present first embodiment, when the discontinuous portion detecting sensor 49 does not detect a portion which is judged to be a connected portion or a deformed portion of a perforation, the film 12a is conveyed by the conveying roller pair 74. When a portion which is judged to be a connected portion or a deformed portion of a perforation is detected by the discontinuous portion detecting sensor 49, the image frame to be read when the detected portion is passing by the conveying roller pair 74 is predicted. Thereafter, before the predicted image frame is read, during the time that the discontinuous portion is between the auxiliary conveying roller pair 73 and the conveying roller pair 74 and the reading position of the CCD line sensor 62 is in a region between image frames, the conveying of the film 12a is switched from the conveying roller pair 74 to the auxiliary conveying roller pair 73, and the film 12a is conveyed.

When the predicted frame is read, the film 12a is conveyed by the auxiliary conveying roller pair 73 disposed at a position which the discontinuous portion has already passed. Thus, there is no fear that, during reading of the predicted frame, a discontinuous portion (a connected portion or a deformed portion of a perforation) of the film 12a will interfere with the auxiliary conveying roller pair 73 such that the conveyed speed is varied, and thus, good reading can be realized.

Operation

Figure 5:
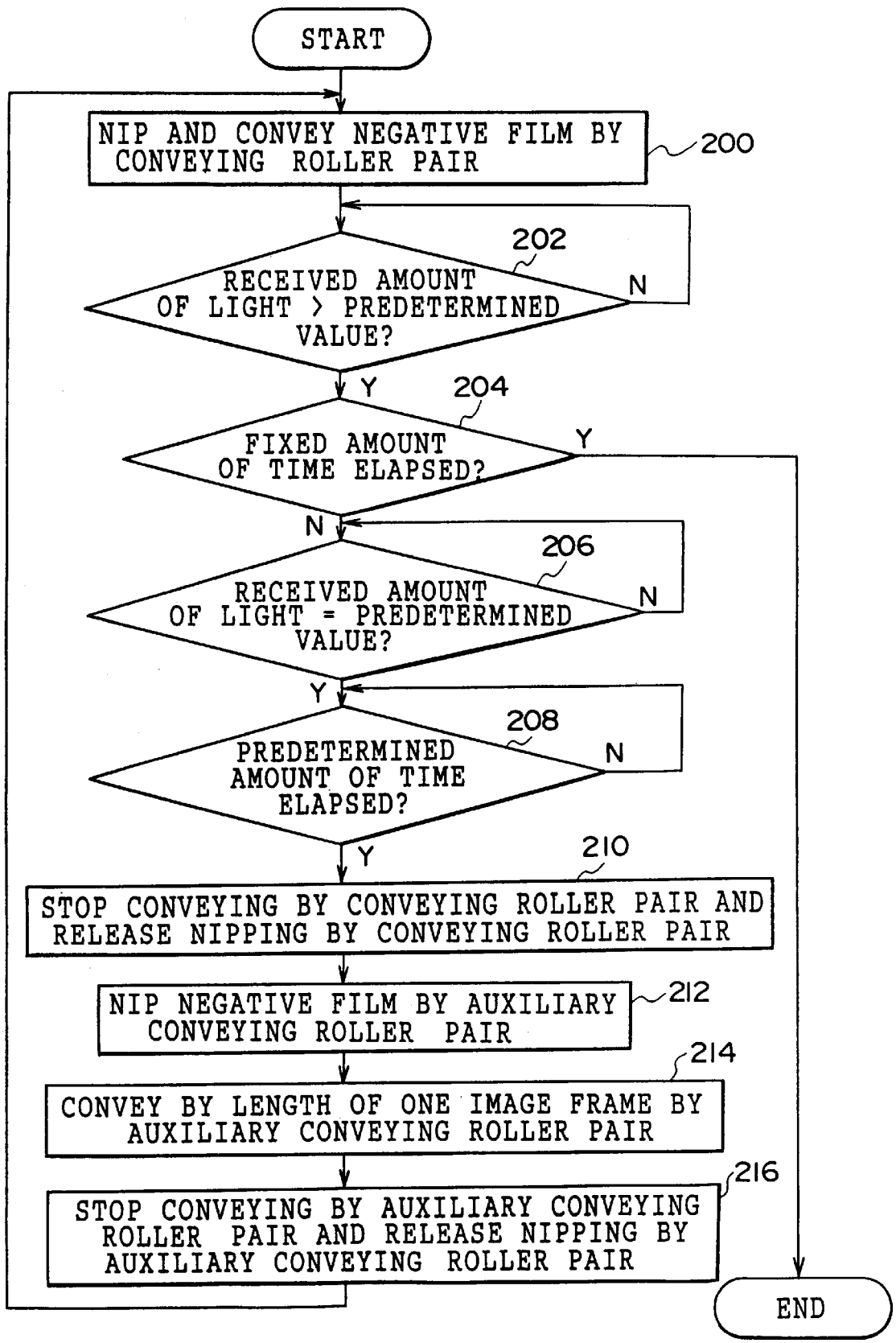
FIG. 5 is a control routine for the conveying of a negative film by a control circuit in a prescan section relating to the first embodiment.

Next, the control routine of conveying of the film 12a, which routine is executed by the control circuit 42 at the prescan section 36, will be described with reference to FIG. 5.

First, in step 200, the film 12a begins to be conveyed while being nipped between the conveying roller pair 74. In subsequent step 202, a determination is made as to whether the amount of light received by the discontinuous portion detecting sensor 49 is greater than a predetermined value. Namely, a determination is made as to whether the received amount of light at the light receiving element 49B of the discontinuous portion detecting sensor 49 is greater than the received amount of light at the time the film base of the film 12a passes by.

If it is determined that the fixed amount of time has not elapsed since the received amount of light became greater than the predetermined value, the routine proceeds to step 206 where a determination is made as to whether the received amount of light is a predetermined value.

If it is determined that the received amount of light is a predetermined value, the routine proceeds to step 208 where a determination is made as to whether a predetermined amount of time has elapsed. This predetermined amount of time in step 208 is, as mentioned previously, the time t3 which is from the time the discontinuous portion is detected by the discontinuous portion detecting sensor 49 to the time, within the period of time after the first time t1 has passed until the second time t2 has been reached, that it is determined that a predetermined portion of a non-image portion between image frames recorded on the film 12a has passed the CCD line sensor 62 reading position.

In step 208, if it is determined that the predetermined amount of time has elapsed, the routine moves on to step 210 where the conveying of the film 12a by the conveying roller pair 74 is stopped and the nipping of the film 12a by the conveying roller pair 74 is released. In subsequent step 212, the film 12a is nipped by the auxiliary conveying roller pair 73, and in step 214, the film 12a is conveyed over a length corresponding to one image frame by the auxiliary roller pair 73.

Thereafter, in step 216, the conveying by the auxiliary conveying roller pair 73 is stopped, and the nipping of the film 12a is released. The routine returns to step 200 where the film 12a is nipped by the conveying roller pair 74 and conveying begins.

The above description explains control of the conveying of the film 12a which control is carried out by the control circuit 42 at the prescan section 36. However, in the fine scan section 38 as well, in the same way, the conveying of the film 12a is switched from the conveying roller pair 74 to the auxiliary conveying roller pair 73 and the film 12a is conveyed. Thus, description of conveying in the fine scan section 38 will be omitted.

In the present first embodiment, the conveying roller pair 74 and the auxiliary conveying roller pair 73 are set apart from one another by at least a length corresponding to one image frame, and when the auxiliary conveying roller pair 73 has conveyed the film 12a by one image frame, conveying of the film 12a by the conveying roller pair 74 again starts. However, the distance by which the conveying roller pair 74 and the auxiliary conveying roller pair 73 are separated is not limited to the length of one image frame. Similarly, with regard to the conveying of the film 12a by the auxiliary conveying roller pair 73 as well, at least as long as a portion which is judged to be a discontinuous portion is conveyed to a position past the conveying roller pair 74, the distance over which the film is conveyed is not limited to the length of one image frame.

As a different structure, for example, the conveying of the film 12a by the auxiliary conveying roller pair 73 and the conveying of the film 12a by the conveying roller pair 74 may be carried out alternately.

Second Embodiment

Figure 6:
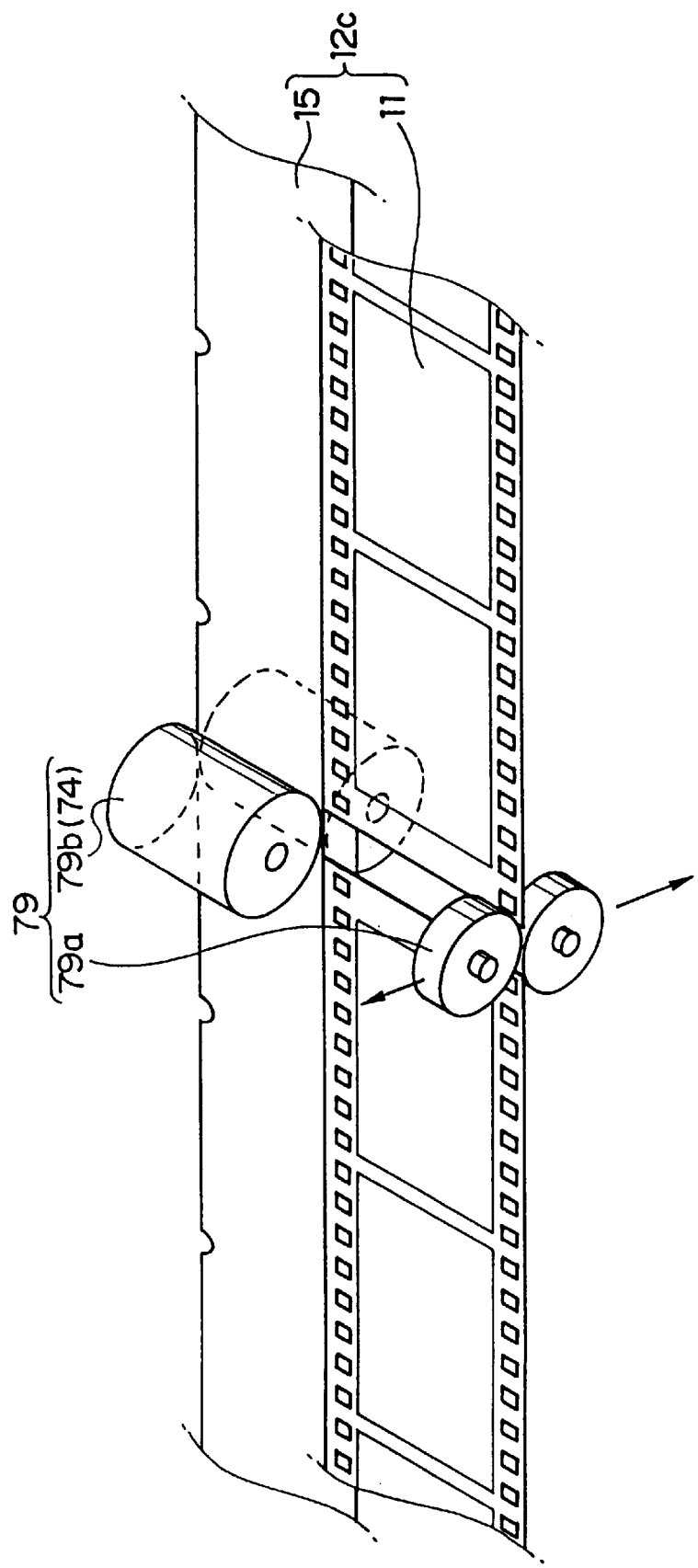
FIG. 6 is a perspective view for explanation of main portions of a film image reading device relating to a second embodiment.

The object of reading of the film image reading device 16 of the second embodiment is a tab-attached film 12c illustrated in FIG. 6. The tab-attached film 12c is formed by a plurality of negative films 11, in which a predetermined number of images has been photographed and which have been developed, being adhered along a long side of a tab 15 so as to form an elongated form. The tab-attached film 12c is set in the film image reading device 16 in a state of being wound in a roll form.

In the film image reading device 16 of the present second embodiment, a conveying roller pair 79 for a tab-attached film, which conveying roller pair 79 is structured as illustrated in FIG. 6, is provided in place of the auxiliary conveying roller pair 73 and the conveying roller pair 74 which are provided with a predetermined interval therebetween along the longitudinal direction of the film 12a in the first embodiment. Other structures are the same as those of the first embodiment, and therefore, description thereof will be omitted.

As illustrated in FIG. 6, the conveying roller pair 79 for a tab-attached film is formed by a film side conveying roller pair 79a (nipping means), which nips and conveys an end portion of the negative film 11, and a tab side conveying roller pair 79b (tab conveying means) which nips and conveys the tab 15.

The film side conveying roller pair 79a is structured such that the nipping of the negative film 11 is releasable, and releases the nipping of the negative film 11 at times when a discontinuous portion is passing by the film side conveying roller pair 79a. At this time, because the tab side conveying roller pair 79b continues to convey the tab, the conveying of the tab-attached film 12c is continuous. When a discontinuous portion has passed by the film side conveying roller pair 79a, the film side conveying roller pair 79a again nips and begins to convey the negative film 11.

In the present second embodiment, the timing for releasing the film nipping by the film side conveying roller pair 79a and the timing for again beginning to nip the film by the film side conveying roller pair 79a are determined as follows.

Figure 7:
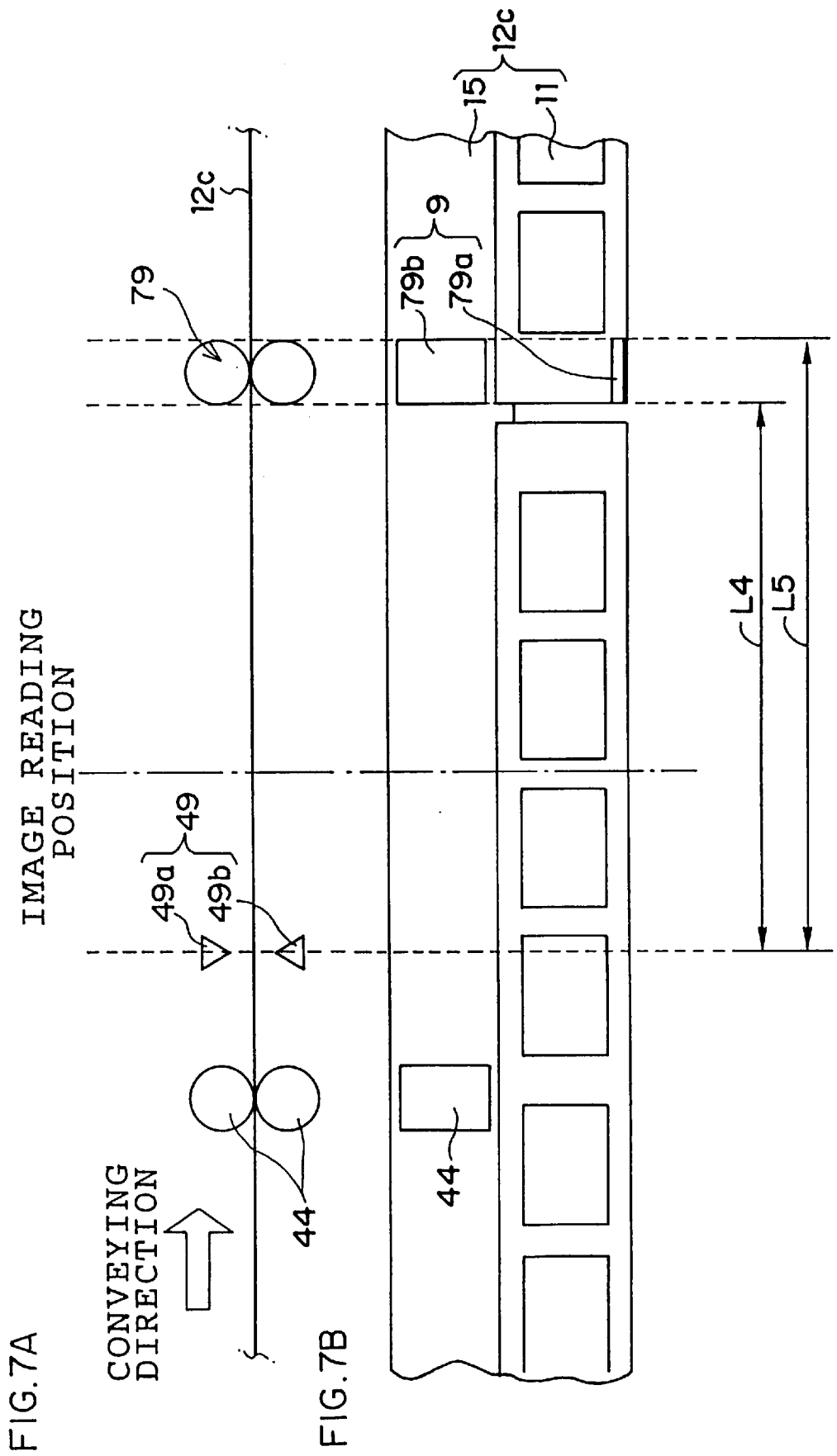
FIG. 7A is a schematic structural view, as viewed from a side surface, of main portions of the film image reading device relating to the second embodiment.
FIG. 7B is a top view of the structure illustrated in FIG. 7A.

As illustrated in FIG. 7, the position of the discontinuous portion detecting sensor 49 and the position of the film side conveying roller pair 79a are respectively fixed with regard to the direction orthogonal to the conveying direction. The conveying speed of the film 12c is also fixed. Thus, on the basis of a distance L4 from the position of the discontinuous portion detecting sensor 49 to a position which is slightly removed toward the discontinuous portion detecting sensor 49 side from the position of the film side conveying roller pair 79a, a time period t4 is calculated which is the time from the time the discontinuous portion detected by the discontinuous portion detecting sensor 49 passes by the discontinuous portion detecting sensor 49 to the time the discontinuous portion reaches a position which is slightly removed toward the discontinuous portion detecting sensor 49 side from the position of the film side conveying roller pair 79a. (Hereinafter, this time t4 will be referred to as the fourth time t4.)

In the same way, on the basis of a distance L5 from the position of the discontinuous portion detecting sensor 49 to a position which is removed by a predetermined distance in the direction opposite the discontinuous portion detecting sensor 49 from the film side conveying roller pair 79a, a time period t5 is calculated which is the time from the time the discontinuous portion detected by the discontinuous portion detecting sensor 49 passes the discontinuous portion detecting sensor 49 to the time the discontinuous portion has completely passed by the film side conveying, roller pair 79a. (Hereinafter, this time t5 will be referred to as the fifth time t5.) The releasing time (hereinafter, the sixth time t6) is calculated by subtracting the fourth time t4 from the fifth time t5.

When the discontinuous portion detecting sensor 49 detects a discontinuous portion, the control circuit 42 determines whether the fourth time t4 has passed from the time the discontinuous portion was detected. If it is judged that the fourth time t4 has passed, the control circuit 42 releases the nipping and conveying of the film by the film side conveying roller pair 79a. Thereafter, the control circuit 42 judges whether the sixth time t6 has passed. When it is determined that the sixth time t6 has passed, the nipping and conveying of the film by the film side conveying roller pair 79a is started again.

In general, the conveying direction length of a discontinuous portion of the film 12C, such as a connected portion of the negative films 11, is shorter than the conveying direction length of one image frame. Thus, the control circuit 42 judges whether the tab side conveying roller pair 79b has conveyed the film 12c by a length corresponding to one image frame, from the time that the nipping and conveying of the film by the film side conveying roller pair 79a was released. If it is determined that the tab side conveying roller pair 79b has conveyed the film 12c by a length corresponding to one image frame, control may be effected such that the nipping and conveying of the negative film 11 by the film side conveying roller pair 79a is started again.

In this way, in accordance with the present second embodiment, there is no need to stop the conveying of the film. Therefore, the processing time can be shortened, and reading of images can be carried out efficiently.

Third Embodiment

The schematic structure of a film image reading device (image reading device) 17 which is a third embodiment of the present invention will now be described with reference to FIGS. 8 through 11.

Schematic Structure of Overall System

Figure 8:
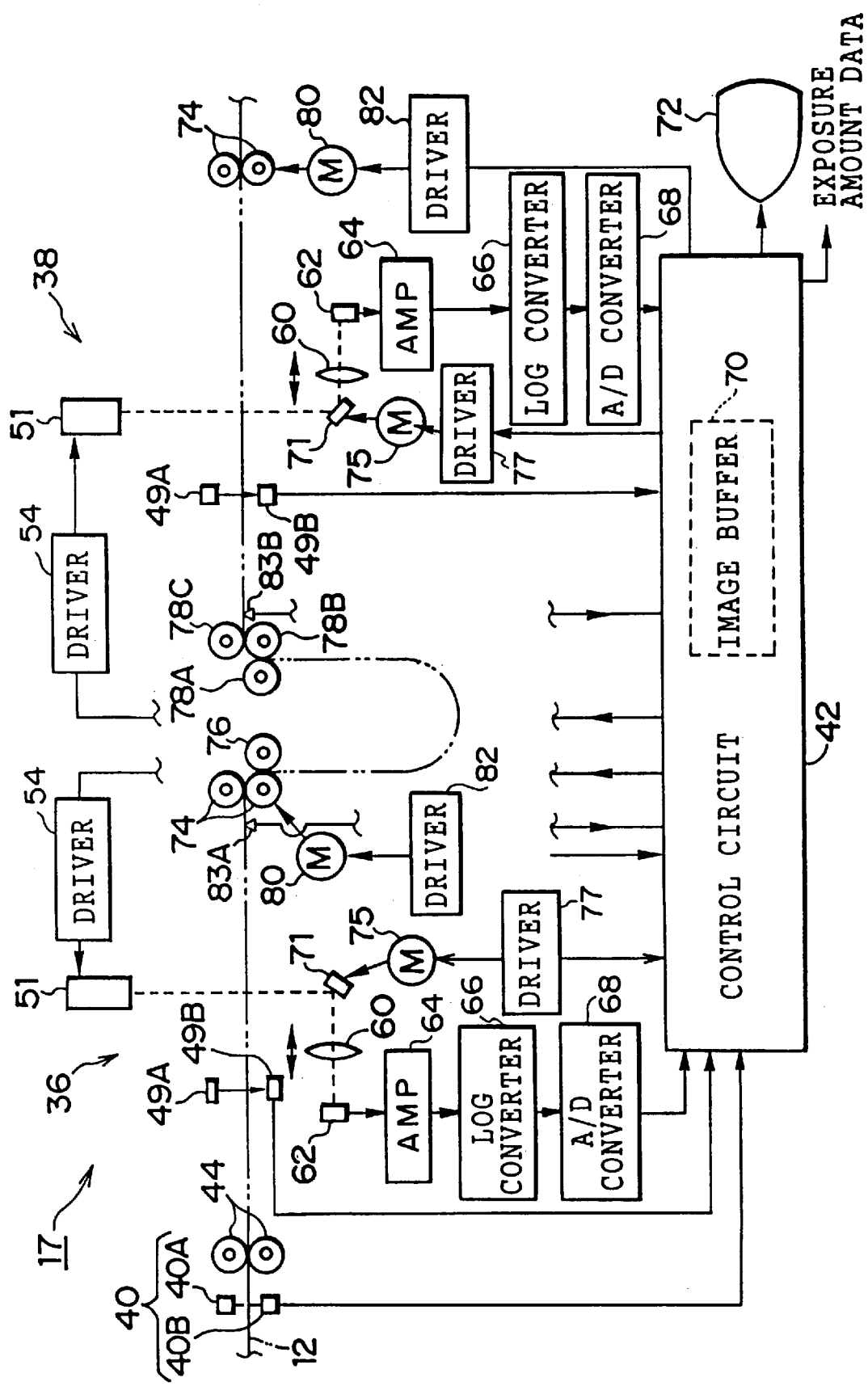
FIG. 8 is an explanatory view illustrating a schematic structure of a film image reading device relating to a third embodiment.

FIG. 8 illustrates the schematic structure of a film image reading device 17 relating to a third embodiment of the present invention. As illustrated in FIG. 8, the film image reading device 17 is structured to read the film 12 by moving the reading position moving means in a state in which the conveying roller pair 74 is temporarily stopped and the illuminated position on the film which is illuminated by a light source unit 51 (control means, reading position moving means) and a reading position on the film which is read by the CCD linear sensor 62 correspond to one another. (Namely, the movement of the light source unit 51 and the reading of the image by the CCD linear sensor 62 are made to be synchronous.)

The light source unit 51 of the prescan section 36 is formed from a lamp which is connected to the control circuit 42 via the driver 54, a CC filter group formed from CC filters, and a light diffusing box. The light source unit 51 is structured so as to be movable in a subscanning direction by a moving means (not illustrated).

At the light emitting side of the light source unit 51 and at the opposite side of the film conveying path from the light source unit 51, a mirror 71 (control means; reading position moving means), a focusing lens 60, and the CCD line sensor 62 are provided in that order. The light emitted from the light source unit 51 passes through the film 12, and thereafter, is reflected by the mirror 71 and focused onto the light receiving surface of the CCD line sensor 62 by the focusing lens 60.

A drive motor 75 is connected to the mirror 71. The drive motor 75 is connected to the control circuit 42 via a driver 77. Further, the focusing lens 60 is moved by a moving mechanism (not illustrated) synchronously with the moving of the mirror 71. Namely, the movement of the mirror 71 and the movement of the focusing lens 60 are controlled by the control circuit 42 such that the light reflected by the mirror 71 is always focused on the light receiving surface of the CCD line sensor 62.

Because the structure of the fine scan section 38 is the same as that of the prescan section 36, description of the fine scan section 38 will be omitted. Further, because other structures are the same as those of the above-described first embodiment, the same reference numerals are used for the same structures and description thereof is omitted.

In the present third embodiment, at times at which the discontinuous portion detecting sensor 49 does not detect portions judged to be connected portions or deformed perforations (i.e., does not detect discontinuous portions), the film 12 is conveyed by the conveying roller pair 74 and reading is carried out.

When a portion judged to be a connected portion or a deformed perforation is detected by the discontinuous portion detecting sensor 49, the image frame which will be read when the detected portion passes by the conveying roller pair 74 is predicted.

Thereafter, when it is time for the CCD linear sensor 62 to read the predicted image frame, the conveying of the film 12 by the conveying roller pair 74 is stopped, and the light source unit 51 and the mirror 71 are moved in the direction of the conveying direction at the same speed as the conveying speed of the conveying roller pair 74. Further, the position of the focusing lens 60 is adjusted so that the light reflected by the mirror 71 is always guided to light-receiving surface of the CCD linear sensor 62.

Operation

Figure 9:
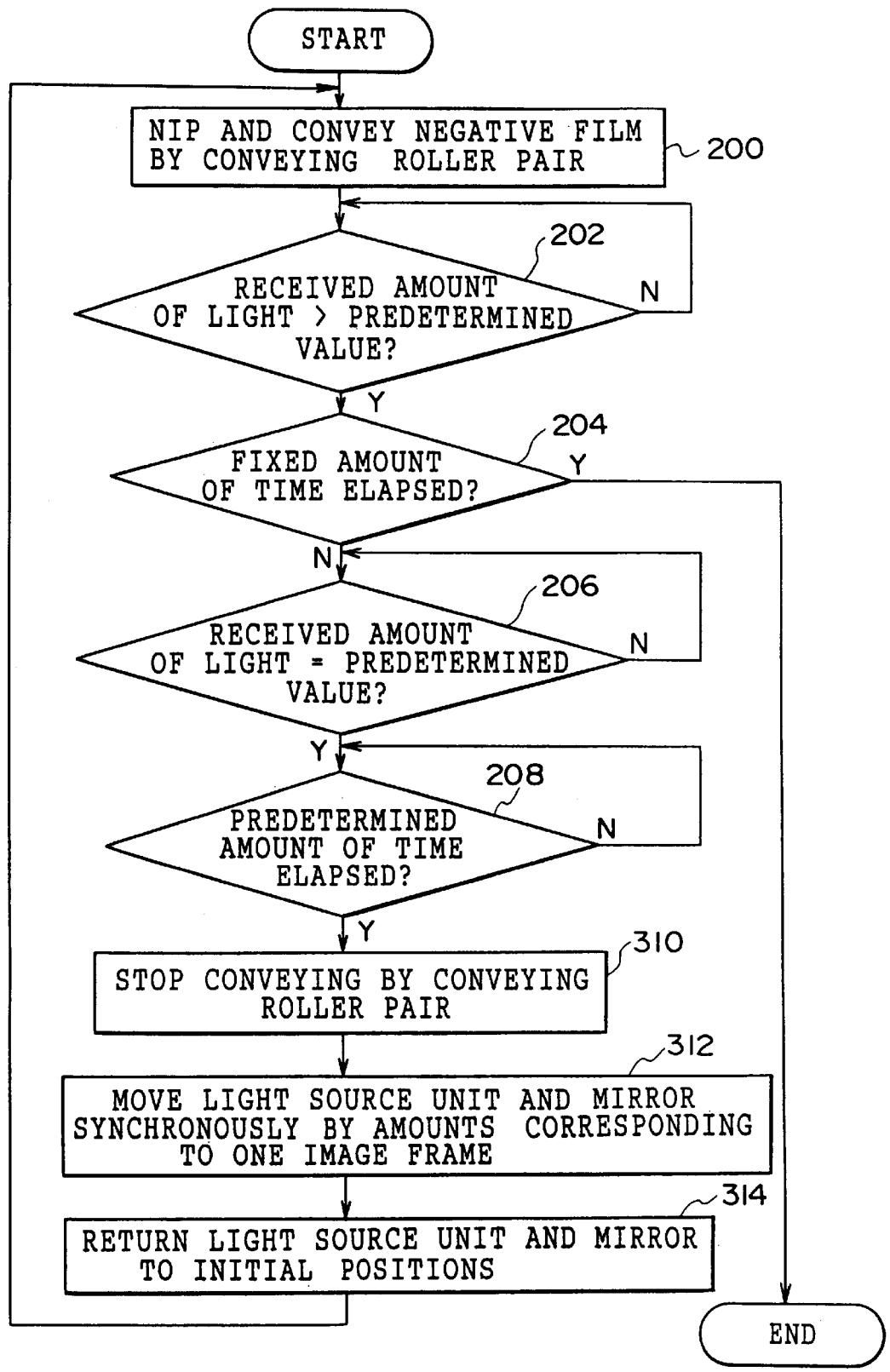
FIG. 9 is a control routine for control of movement of a light source unit and movement of a mirror by a control circuit in a prescan section relating to the third embodiment.

Next, the control routine for the conveying of the film 12, which control routine is carried out by the control circuit 42 at the prescan section 36, will be described with reference to FIG. 9. Steps in which the same control is carried out as in the previously-described control routine of the first embodiment in FIG. 5 are denoted by the same numerals, and description thereof is omitted.

In step 208, if it is determined that the predetermined amount of time has passed, the routine moves on to step 310 where the conveying of the film 12 by the conveying roller pair 74 is stopped.

In subsequent step 312, the light source unit 51 is moved so that the illumination position on the film is moved by a length of one image frame in the direction in which the film 12 is subscanned. Control is effected such that, synchronously with the movement of the light source unit 51, the mirror 71 is moved by a length of one image frame in the direction in which the film 12 is subscanned, and the position of the focusing lens 60 is changed. Regardless of the movement of the illumination position on the film which accompanies the movement of the light source unit 51, the light from the light source unit 51 is focused on the light-receiving surface of the CCD linear sensor 62.

When reading of one image frame by the moving of the light source unit 51, the mirror 71 and the focusing lens 60 has been completed, in step 314, the light source unit 51, the mirror 71 and the focusing lens 60 are returned to their initial positions. Thereafter, the routine returns to step 300 where the film 12 is nipped by the conveying roller pair 74 and conveying begins.

The above explanation describes a case in which control of the movement of the light source unit 51, the mirror 71 and the focusing lens 60 are carried out by the control circuit 42 at the prescan section 36. Because control at the fine scan section 38 is similar to that at the prescan section 36, description of control at the fine scan section 38 will be omitted.

In this way, in the present third embodiment, the image frame is read as usual at times when the discontinuous portion does not interfere with the conveying roller pair 74. When the discontinuous portion may interfere with the conveying roller pair 74, the conveying of the film 12 is temporarily stopped, the light source unit 51 and the mirror 71 are moved, and the position of the focusing lens 60 is adjusted such that the light reflected by the mirror 71 is always focused on the light receiving surface of the CCD linear sensor 62. In this way, the image frame, which is the subject of reading at the time the discontinuous portion may interfere with the conveying roller pair 74, is read. Thereafter, the light source unit 51 and the mirror 71 are returned to their usual positions, and reading of the film is started again.

Due to the above-described structure, there are no image frames which are read at times when the conveying speed of the film 12 changes due to interference between a discontinuous portion and the conveying means. Thus, good reading can always be carried out.

In the present third embodiment, the mirror 71 and the focusing lens are moved so as to follow the movement of the illumination light (the light source unit 51) which moves in the subscanning direction. However, the present invention is not limited to the same. For example, following the illuminated light moving in the subscanning direction, the mirror 71 may be rotated and the focusing lens may be moved such that the light reflected by the mirror 71 is always focused on the light receiving surface of the CCD linear sensor 62. Or, it is possible to not use the mirror 71 and for the CCD linear sensor 62 itself to be moved so as to follow the illuminated light moving in the subscanning direction.

In the present third embodiment, the light source unit 51 itself is moved in order to move the illuminated light in the subscanning direction. However, the present invention is not limited to the same. It is possible for the light source unit 51 to be fixed, and to illuminate light from the light source unit 51 onto a desired position on the film by using a light path deflecting member such as a reflecting mirror or the like.

In this case as well, for example, the light path deflecting member may be moved in the subscanning direction at the same speed as the conveying speed. Or, the deflecting angle of the light deflecting surface of the light path deflecting member may be controlled so as to be changed such that the illumination position on the film moves in the subscanning direction.

Further, in the present third embodiment, the reading of the film 12 by moving the light source unit 51 and the mirror 71 is carried out per one image frame (the predicted image frame). Thus, after reading of the film 12 by movement of the light source unit 51 and the mirror 71, the film 12 is conveyed by a length of one image frame. Thereafter, regular reading by the CCD linear sensor 62 is started again. However, the reading of the film 12 by the movement of the light source unit 51 and the mirror 71 is not limited to one image frame. Accordingly, restarting of ordinary reading by the CCD linear sensor 62 is not limited to after the conveying of the film by one image frame.

In the present third embodiment, the position of the mirror 71 is moved without moving the CCD linear sensor. However, the present invention is not limited to this structure.

Figure 10A:
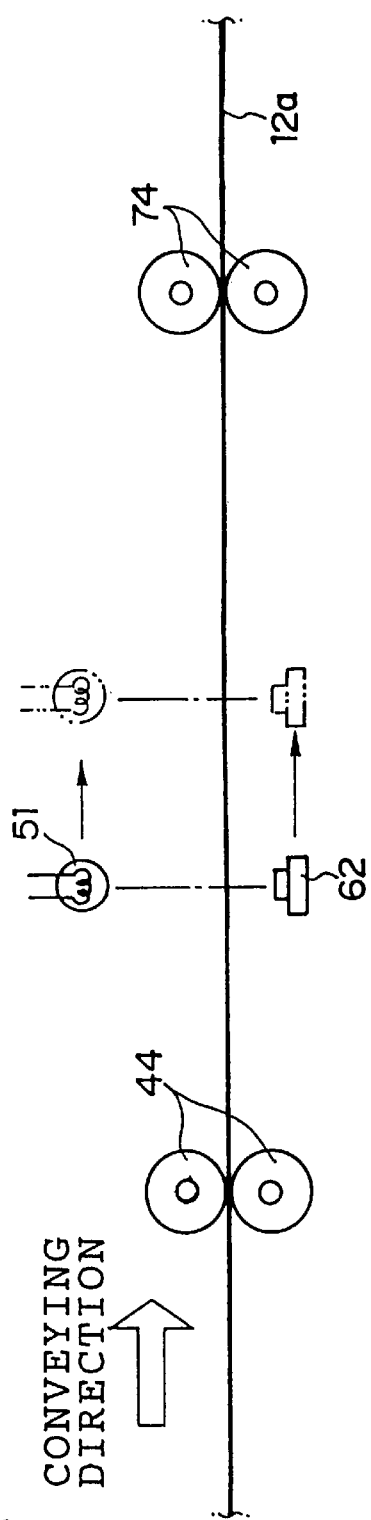
FIG. 10A is a schematic structural view, as viewed from a side surface, of a film image reading device, and explains an applied example of the third embodiment.
Figure 10B:
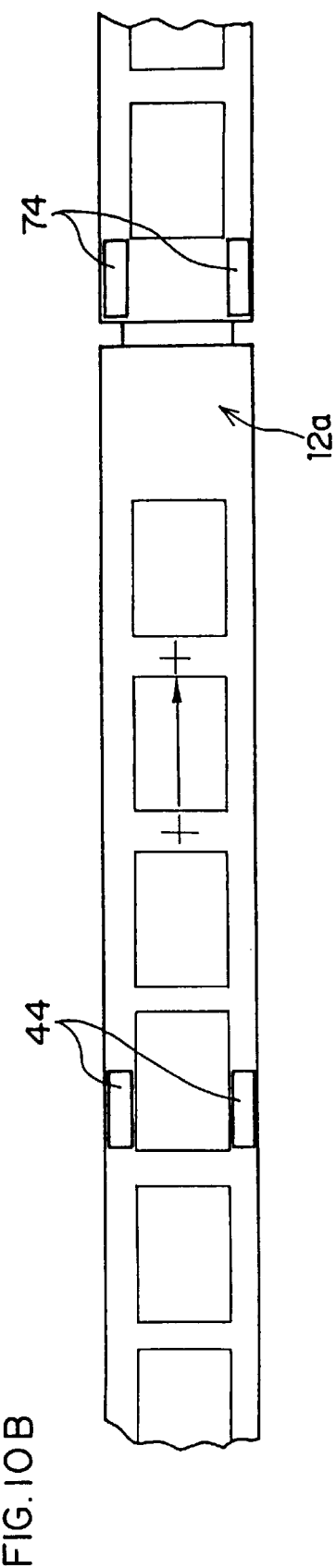
FIG. 10B is a top view of the structure illustrated in FIG. 10A.

For example, as illustrated in FIG. 10, the light source unit 51 and the CCD linear sensor 62 can be moved in the subscanning direction. Or, as illustrated in FIG. 11, the light source unit 51 may be fixed, and a mirror 71b which is movable in the subscanning direction may be provided above the film 12a. By moving this mirror 71b in the subscanning direction synchronously with the CCD linear sensor 62, the illuminated position of the light illuminated on the film 12 can be moved.

Of course, the opposite structure is possible. Namely, the CCD linear sensor 62 may be fixed, and the mirror 71b which is movable in the subscanning direction may be provided between the CCD linear sensor 62 and the film. The mirror 71b may be moved in the subscanning direction synchronously with the light source unit 51.

Further, the light source unit 51 and the CCD linear sensor 62 may be fixed. Two mirrors, which are movable in the subscanning direction, may be provided, one between the light source unit 51 and the film 12, and one between the film 12 and the CCD linear sensor 62. By moving these two mirrors synchronously in the subscanning direction, the illuminated position of light on the film 12 illuminated by the light source unit 51 and the reading position on the film 12 read by the CCD linear sensor 62 can be made to correspond to one another.

It is possible to dispose two reading means, such as the CCD line sensor, at positions separated by at least the length of one image frame in the negative film conveying direction. The image frame, which is to be read by one of the reading means at the time it is predicted that interference may occur, can be read by the other reading means at a time other than times when it is predicted that interference may occur (e.g., before interference may occur). In this case as well, because the conveying of the film does not have to be stopped, the processing time can be shortened, and effective reading of the image can be carried out.

In the above-described first through third embodiments, the discontinuous portion detecting sensors 49 are provided at positions corresponding to the both transverse direction end portions of the film 12. However, for example, as illustrated in FIGS. 2 or FIG. 6, in a case in which respective films 11 are connected together by a tab or by splicing tape with at least the end portions of the films 11 being separated from one another, it is possible to provide the discontinuous portion detecting sensor 49 at only one transverse direction end portion side of the film 12*a*, 12*c*. In this case, because only one discontinuous portion detecting sensor 49 is required, the structure of the device is simplified, and the cost of the device can be decreased by that much.

For example, in cases in which it is difficult to determine whether the end portions of films 11 are separated (such as in FIG. 3 in which the both ends of the films 11 are connected together by short splicing tapes 14), or in cases in which the connected end portions of the film 12*a* illustrated in FIG. 2 are not separated, it can be determined that a discontinuous portion has been detected if, as in the present embodiment, the discontinuous portion detecting sensors 49 are provided at positions corresponding to the both transverse direction end portions of the film 12 and the amount of light received by the light-receiving elements increases or decreases for a fixed period of time.

Fourth Embodiment

Figures 12A, 12B:
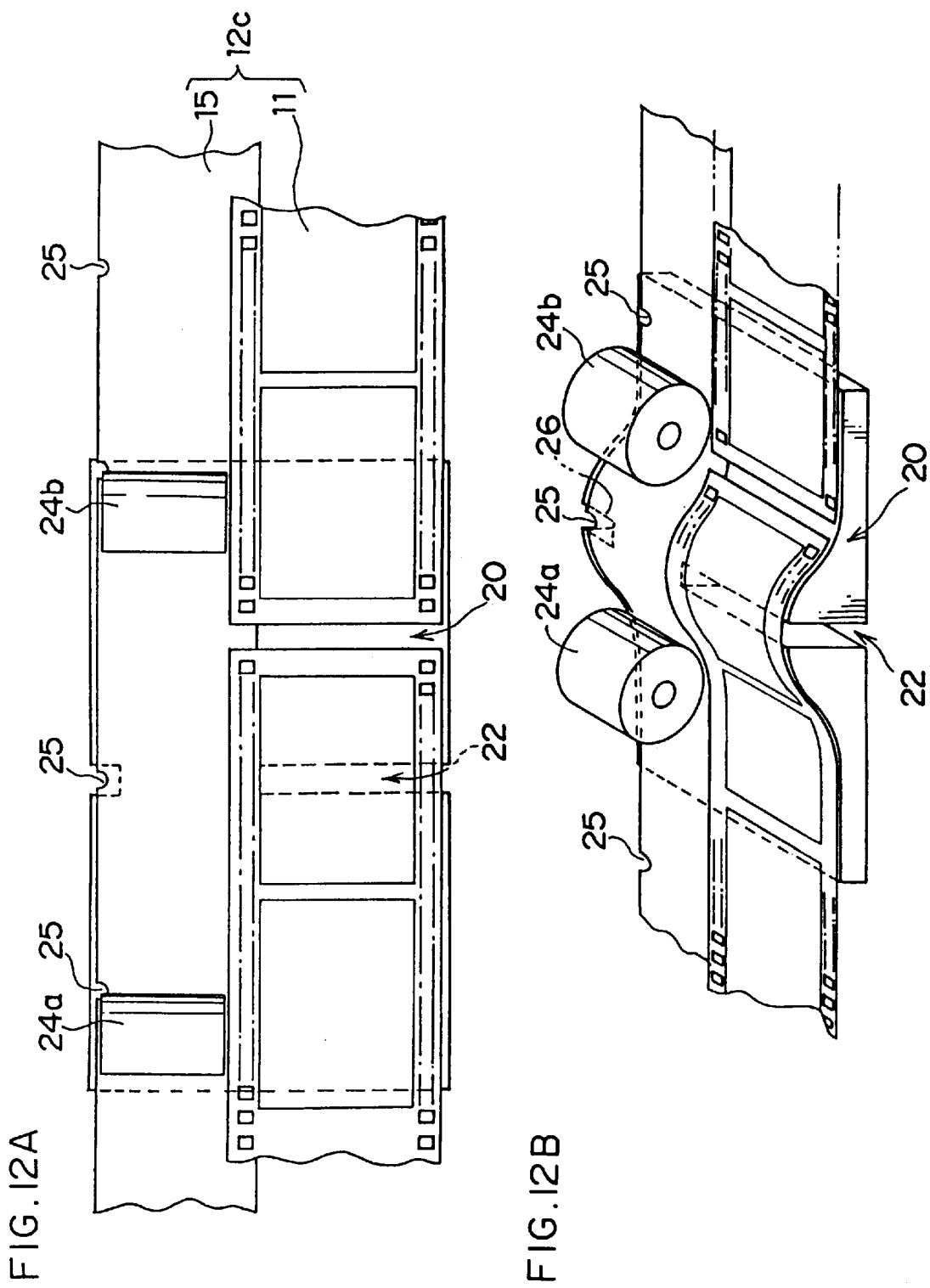
FIG. 12A is a top view for explaining main portions of a film image reading device relating to a fourth embodiment of the present invention.
FIG. 12B is a perspective view of the structure illustrated in FIG. 12A.

The film image reading device (image reading device) of the fourth embodiment is an applied example of the second embodiment. The conveying roller pair 74 which nips and conveys the tab 15 is provided at the position at which the conveying roller pair 79 for the tab-attached film is provided. Further, as illustrated in FIG. 12, at the image reading position, a convex guide member 20 is provided which supports the film 12*c* from the bottom side thereof and which forms a film conveying surface.

The film image reading device of the present fourth embodiment is structured such that all of the conveying rollers are tab-side conveying roller pairs which nip and convey the tab 15, and convey the film 12*c* without contacting the negative film 11. Other structures are the same as those of the previously-described second embodiment, and description thereof is omitted.

The convex guide member 20 is disposed such that the image reading position is at the top peak portion thereof. A cut-out portion (pass-through portion) 22, through which light which has passed through the negative film 11 passes, is formed at the film 11 conveying side of the peak portion of the convex guide member 20.

Guide rollers 24*a*, 24*b*, which press the film 12*c* (the tab 15) from the top side, are disposed at a conveying direction upstream side position and a conveying direction downstream side position at the tab 15 conveying side of the convex guide member 20.

In the present fourth embodiment, the film 12*c* is nipped and conveyed by the two guide rollers 24*a*, 24*b* and the convex guide member 20. At this time, the film 12*c* is curved along the surface of the convex guide member 20 due to the pressing force from the upper side by the guide rollers 24*a*, 24*b* and the pushing up force from the bottom side by the peak portion of the convex guide member 20. The film 12*c* is made flat in the vicinity of the peak portion position of the convex guide member 20.

In the state in which the film 12*c* is curved, the negative film 11 is not twisted due to tension of the negative film 11. Therefore, good conveying can be achieved even without nipping and conveying the negative film 11 and by nipping and conveying only the tab 15.

Namely, the film 12*c* is nipped and conveyed by the two guide rollers 24*a*, 24*b* and the convex guide member 20. Therefore, good reading and conveying can be achieved without being affected by the space between the negative films 11.

In the present fourth embodiment, information, such as the frame numbers or the like, is recorded in the form of a bar code or alphanumeric characters or the like (not shown) on the negative film 11 side of the film 12*c* which is the object of reading. Further, notches 25 for detecting frame positions are formed in the tab 15 side at predetermined intervals in correspondence with the respective frames.

Thus, a cut-out portion 26 for reading the notches 25 is formed in a predetermined position of the guide member 20 which the notches 25 pass by. The CCD linear sensor 62 for image reading reads the images, and reads the notches formed in the tab 15 through the cut-out 26 for reading the notches 25. Further, instead of the cut-out 26, the passthrough portion for the reading of the notches 25 may be formed by a slit or a transparent member.

In the present fourth embodiment, the CCD linear sensor 62 for image reading reads the images, reads the information such as barcodes or alphanumeric characters recorded on the film 12*c*, and reads the notches. Therefore, there is no need to provide a sensor for reading this information or a sensor for detecting frames. Thus, the structure of the device can be made more simple. Of course, it is possible for the CCD linear sensor 62 to read only the images, and to provide a sensor for reading the information and a sensor for detecting the frames.

Moreover, in the present fourth embodiment, the cut-out portion 22 is formed in the guide member 20 so that the light transmitted through the film 12*c* is not obstructed by the guide member. However, the present invention is not limited to the guide member 20 provided with the cut-out portion 22. Structures are possible in which, for example, a slit or a transparent material which does not obstruct the passage of light is provided at least at the image reading position, so that the light which has passed through the film 12*c* can pass through the guide member 20.

In the above-described embodiments, a transmission-type reading mechanism is used. However, the present invention is also applicable to a reflection-type reading mechanism structured to be provided on the same side as the light source unit and the reading mechanism.

Moreover, in the above embodiment, description is given of a case in which the present invention is applied to a negative film as the photographic photosensitive material. However, the present invention is not limited to the same, and may be applied to the reading of a reversal film (positive film).

As described above, in accordance with the image reading method of the present invention, even if there is a connected portion or a deformed portion of a perforation which may cause changes in the conveying speed, good reading can be carried out.

Further, in accordance with the image reading device of the present invention, an elongated photographic photosensitive material which includes connected portions or perforations which have deformed portions can always be conveyed at a predetermined conveying speed, and good reading can be carried out continuously.

What is claimed is:

1. An image reading method in which an elongated photographic photosensitive material on which a plurality of image frames are recorded is conveyed along a longitudinal direction of the elongated photographic photosensitive material and the image frames are read, comprising the steps of:

detecting a portion of the elongated photographic photosensitive material which may change a conveying speed of the elongated photographic photosensitive material by interfering with a conveying means, which conveys the elongated photographic photosensitive material, while the conveying means is conveying the elongated photographic photosensitive material;

predicting an image frame which will be read by an image reading means, which reads image frames, at the time that the detected portion of the elongated photographic photosensitive material may interfere with the conveying means; and reading the predicted image frame by the image reading means such that the portion of the elongated photographic photosensitive material does not interfere with the conveying means.

2. An image reading method according to claim 1, wherein when at least the predicted image frame is read by the image reading means, instead of being conveyed by the conveying means, the elongated photographic photosensitive material is conveyed by an auxiliary conveying means which is provided at a position which is separated from the conveying means by a predetermined distance in the conveying direction of the elongated photographic photosensitive material.

3. An image reading method according to claim 2, wherein the predetermined distance is a length greater than or equal to a length of an image frame in the conveying direction.

4. An image reading device comprising:

a plurality of conveying means for conveying an elongated photographic photosensitive material on which a plurality of image frames are recorded;

image reading means for reading an image frame of the elongated photographic photosensitive material conveyed by the conveying means;

sensing means for sensing a portion of the elongated photographic photosensitive material which portion may change a conveying speed of the elongated photographic photosensitive material, due to the portion interfering with one of the plurality of conveying means while the elongated photographic photosensitive material is being conveyed by the one of the plurality of conveying means;

predicting means for predicting, on the basis of results of sensing by the sensing means, an image frame which will be read by the image reading means at the time the portion of the elongated photographic photosensitive material may interfere with the one of the plurality of conveying means; and control means for effecting control such that the predicted image frame is read by the image reading means such that the portion of the elongated photographic photosensitive material does not interfere with the one of the plurality of conveying means.

5. An image reading device according to claim 4, further comprising an auxiliary conveying means which conveys the elongated photographic photosensitive material and is provided at a position which is separated from the one of the plurality of conveying means by a predetermined distance in the conveying direction of the elongated photographic photosensitive material, wherein the controlling means effects control such that, when at least the predicted image frame is read by the image reading means, the elongated photographic photosensitive material is conveyed by the auxiliary conveying means instead of being conveyed by the one of the plurality of conveying means.

6. An image reading device according to claim 5, wherein the predetermined distance is a length greater than or equal to a length of an image frame in the conveying direction.

7. An image reading device according to claim 4, further comprising:

reading position moving means for synchronously moving a position of light illuminated onto the elongated photographic photosensitive material and a reading position on the elongated photographic photosensitive material by the image reading means, wherein the control means effects control such that in a state in which conveying of the elongated photographic photosensitive material is stopped, the reading position moving means moves a position of light illuminated onto the elongated photographic photosensitive material and a reading position on the elongated photographic photosensitive material by the image reading means, so that at least the predicted image frame is read by the image reading means.

8. An image reading device according to claim 4, wherein the elongated photographic photosensitive material is formed by ones of transverse direction ends of a plurality of photographic photosensitive materials being adhered to a transverse direction end of an elongated tab, the conveying means is formed from a first conveying means which nips other transverse direction ends of the photographic photosensitive materials and whose nipping of the other transverse direction ends of the photographic photosensitive materials can be released and which conveys the elongated photographic photosensitive material, and a second conveying means which nips the elongated tab and conveys the elongated photographic photosensitive material, and the control means effects control such that, before the first conveying means interferes with the portion of the elongated photographic photosensitive material, nipping of the photographic photosensitive materials by the first conveying means is released and the elongated photographic photosensitive material is conveyed by the second conveying means.

9. An image reading device according to claim 4, wherein the reading means is a linear CCD.

10. An image reading device which reads an image frame of an elongated photographic photosensitive material which is formed by respective one transverse direction ends of plural photographic photosensitive materials being adhered to one transverse direction end of an elongated tab, comprising:

nipping means for nipping a photographic photosensitive material such that the photographic photosensitive material can be conveyed, the nipping means being structured such that nipping of the photographic photosensitive material is releasable;

tab conveying means for nipping and conveying the elongated tab;

reading means for reading, at a predetermined reading position, an image frame being conveyed;

detecting means for, while the elongated photographic photosensitive material is being conveyed, detecting a portion of a photographic photosensitive material that may interfere with the nipping means and change the conveying speed; and control means for, on the basis of results of detection by the detecting means, effecting control such that before the portion of the photographic photosensitive material interferes with the nipping means, the nipping of the photographic photosensitive material by the nipping means is released and the image frame is read by the reading means.

11. An image reading device which reads an image frame of an elongated photographic photosensitive material which is formed by respective one transverse direction ends of plural photographic photosensitive materials being adhered to one transverse direction end of an elongated tab, comprising:

nipping means for nipping a photographic photosensitive material such that the elongated photographic photosensitive material can be conveyed;

tab conveying means for nipping the elongated tab and conveying the elongated photographic photosensitive material;

reading means for reading, at a predetermined reading position, an image frame being conveyed;

detecting means for, while the elongated photographic photosensitive material is being conveyed, detecting a portion of the elongated photographic photosensitive material that may interfere with the nipping means and change the conveying speed;

predicting means for, on the basis of results of detection by the detecting means, predicting an image frame that will be read at the time the portion of the elongated photographic photosensitive material will interfere with the nipping means;

reading position moving means for synchronously moving a position of light illuminated onto the photographic photosensitive material and a reading position on the photographic photosensitive material read by the reading means; and control means for controlling the reading position moving means such that, before the portion of the elongated photographic photosensitive material interferes with the nipping means, conveying of the elongated photographic photosensitive material is stopped, and at least the predicted image frame is read by the reading means.

12. An image reading device which reads an image frame of an elongated photographic photosensitive material which is formed by respective one transverse direction ends of plural photographic photosensitive materials being adhered to one transverse direction end of an elongated tab, comprising:

tab conveying means for nipping the tab and conveying the elongated photographic photosensitive material;

reading means for reading, at a predetermined reading position, an image frame being conveyed; and a guide member for guiding the tab and the photographic photosensitive material such that the tab and the photographic photosensitive material are conveyed in a state of being curved in a convex shape, wherein the reading position is provided at a position at which the guide member becomes a top peak portion, and at least the reading position on the guide member is a pass-through portion.

13. An image reading device according to claim 12, wherein in a case in which a mark expressing a position of an image frame of the photographic photosensitive material is formed in the tab, the pass-through portion is provided such that the mark can be read by the reading means.

14. An image reading device according to claim 13, wherein the reading means reads the image frame and the mark.

* * * * *